UNITED STATES PATENT OFFICE.

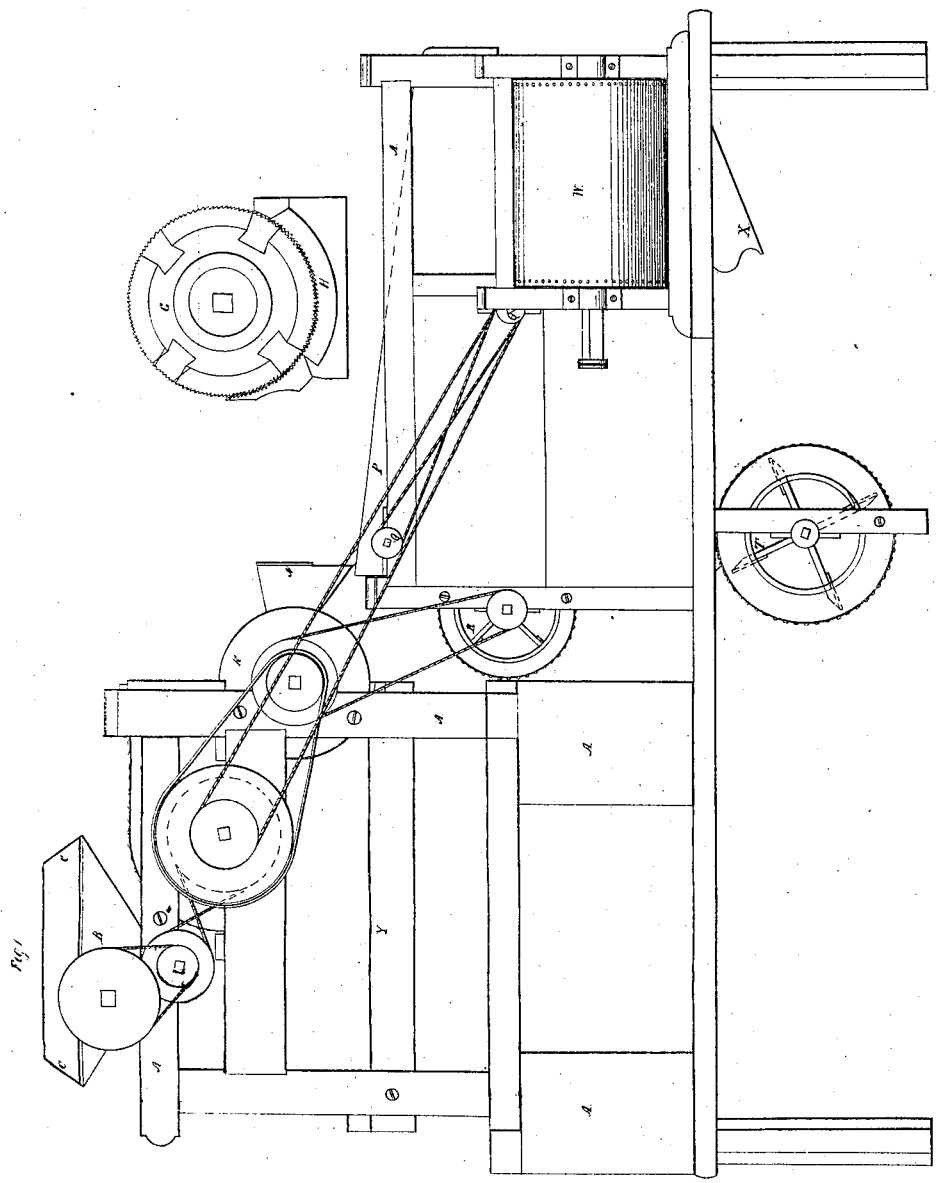

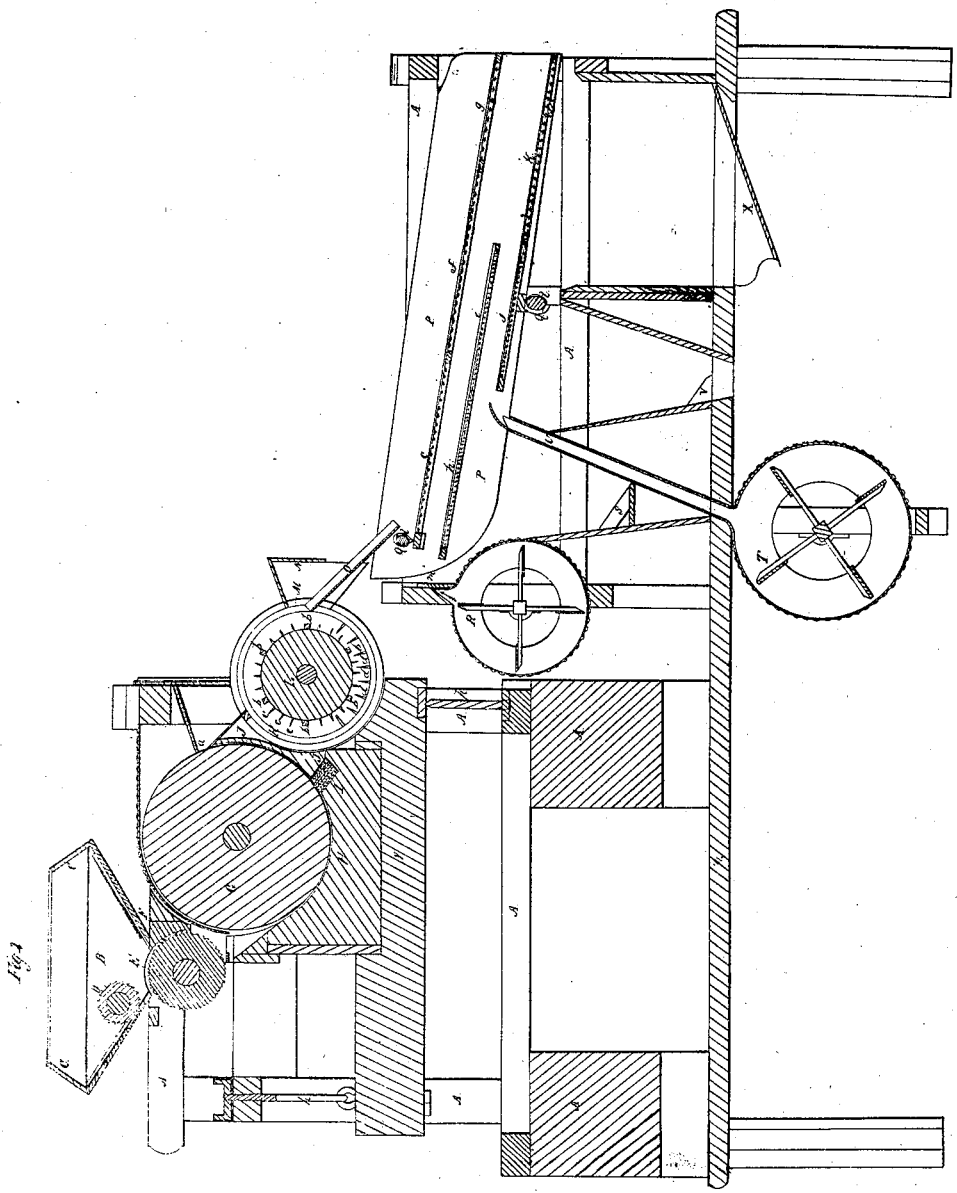
W. Wilber
Cotton Seed Huller.
Nº 13,556.
Patented Sept. 11, 1855.
Sheet 2, 3 Sheets.

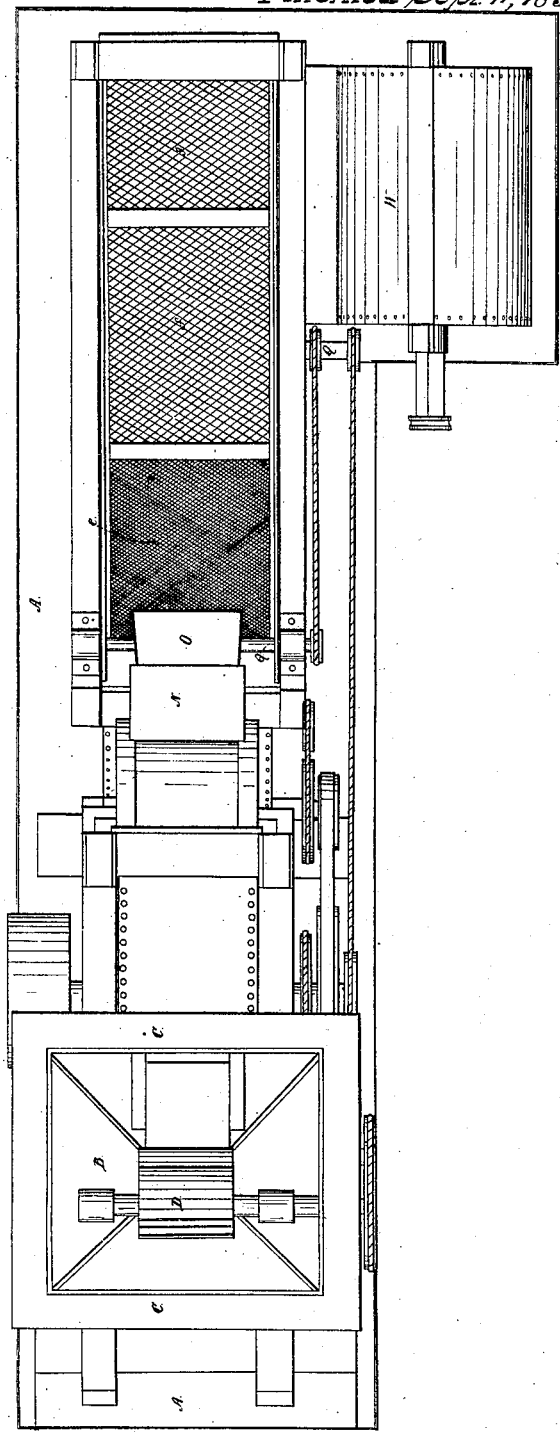

WILLIAM WILBER, OF NEW ORLEANS, LOUISIANA.

IMPROVEMENT IN COTTON-SEED HULLERS.

Specification forming part of Letters Patent No. 13,556, dated September 11, 1855.

*To all whom it may concern:*

Be it known that I, WILLIAM WILBER, of the city of New Orleans, in the parish of Orleans and State of Louisiana, have invented certain new and useful Improvements in Machines for Hulling, Bruising, and Separating Cotton and other Seeds for the Purpose of Manufacturing Oil; and I do hereby declare the following to be a full, clear, and exact description of the same, reference being had to the accompanying drawings, making a part thereof, in which—

Figure 1 represents a side elevation of the machine. Fig. 2 represents a vertical longitudinal section through the center of the same, and Fig. 3 represents a top or bird's-eye view.

Similar letters in the several figures denote like parts.

The nature of my invention consists, first, in combining, in the manner to be described, the several devices for feeding, crushing, teazing, or mangling cotton-seeds in one continuous operation; and also in the combination of the graduated blasts and screens for the purpose of separating the light impurities without carrying out with them the light particles of ground seeds.

To enable others skilled in the art to make and use my invention, I will proceed to describe the same with reference to the drawings.

A stout substantial frame, A, capable of supporting the machine, is first constructed, and upon its highest portion, near one end thereof, is arranged the hopper B, having its top portions, C, inclined inward to prevent the seeds, which are lifted up or agitated in said hopper, from choking and from being thrown out.

Cotton-seeds after leaving the gin still retain many fibers of the cotton, and these fibers so unite and hold the seeds together as to make anything like regular feeding of them to machines a difficult matter. The center portions of the mass will drop through, leaving that portion next the sides of the hopper remaining. It is necessary, therefore, to the effective operation of the machine that the feed should be forced. I accordingly, for this purpose, place in the hopper, a little to one side of the opening in its bottom, a revolving cylinder, D, having on its periphery saw-teeth-shaped flutes or grooves, which pick up or loosen up the seeds from the mass in the hopper and cause them to work down toward the opening, whence they are carried to the crushing or grinding apparatus.

Underneath the hopper B, so as to revolve in close proximity to the opening in its bottom, or even slightly above or through said opening, is placed the cylinder E, provided with projecting teeth on its periphery, of steel or any other suitable hard and durable material. This cylinder E revolves close against a breastplate, F, also provided with projecting grooves, and performs the double service of carrying and chopping or chaffing the seeds preparatory to their being ground or crushed. The cylinder E takes the seeds from the bottom of the hopper and carries them against the breastplate F in nearly a horizontal direction, and by its close rotation against said breastplate chops or chaffs the seed. The seeds thus having undergone their preparatory reduction, drop down behind the main grinding or crushing cylinder G, and its bed or concave H receives them. The surfaces of both the cylinder and concave may be roughened, and they may be made of steel plates or chilled cast-iron segments, or of burr-blocks, whichever may be found most convenient or economical. On the front part of the bed or concave H is represented, at I, the steel plates with sharpened edges. More or less of these steel plates, even to the entire surface of the concave, may be thus arranged.

J is an extended breastplate resting on the front part of the concave H, and reaching up slightly above the center of the cylinder G. It is made separate from the concave, so as to be readily removed and replaced when worn out, or when it requires resharpening. The partially chopped or chaffed seeds undergo a grinding or crushing operation between the revolving cylinder and its concave, and are carried up by the cylinder to the top of the extended breastplate J, where an inclined scraper, $a$, approaches said cylinder, near enough to remove all the crushed material adhering thereto, and directs it into the casing K, in which revolves a cylinder, L, provided with beaters $b\ b$, and also with teeth $c\ c$, which run between teeth $d\ d$, fixed in the interior of said casing, so as to mangle or teaze the ground material, and thus loosen and shake it up for the separating. The beaters $b$ on the cylinder L serve both to throw the material off against the casing and to create a blast to aid the material to pass out of the case K and into the separators. There is an opening, M, in the case K, on the opposite side thereof from where the material enters the case, out of which opening M the material is thrown or carried, and if thrown with enough force strikes against the hood or shield N and drops onto a spout or trough, O, which leads it onto the first screen, e, which is one of a series of graduated screens, as to their meshes, set in a frame, P, inclined, as seen in the drawings, so that the material will pass over the series of screens e f g. Underneath the top series of screens e f g, but in the same frame with them, are other graduated screens, h i and j k. The entire box or frame of screens is agitated by the cams l l on the shafts Q Q, these cams being so arranged as to give the screens a vertical and longitudinal motion, both, the one more especially for screening, the other for conveying the material along on the screens, the sluggishness or adhesive properties of the ground material being of such a character that all its various operations must be forced. As the material leaves the spout O to fall upon the screens, and all the while as it passes over the screens, it is subjected to graduated blasts from fan-blowers suitably arranged for the purpose, as will be explained, together with the necessity of the series of graduated blasts, instead of one single blast. The material in its crushed, chopped, and mangled state comes to the screens in all sizes, shapes, and of varying specific gravities, not according to their quality, but the oily parts often lighter than the chaff, hulls, or fibrous mixtures, which it is desirable to separate from the oily portions of the seeds. If in such condition a blast sufficient to carry off the hulls, chaff, &c., were introduced, it would carry off also the portions which it is desirable to save, and it was only after repeated trials and experiments that the combined use of graduated screens with graduated blasts was found to answer the purpose. The first separation must be more with regard to size than quality, the second one approaches the separation of qualities, and the third completes the separation. The first separation removes from the mass the portions which would be carried off by the blast of the second, and the second separation performs the same office for the third one. The first blast and screen are light and of fine mesh, the second blast stronger than the first, and the corresponding screens coarser. The third blast and screen are increased in volume and mesh, each preceding fan-blower and mesh having removed the valuable products, which its succeeding co-operators would blow off with the chaff, hulls, &c., if it were allowed to come to them. The first and lightest blast comes from the fan R, passes out of the case at m, and passes between the screens h e, up through the latter, and carries off such light matter as its volume is capable of removing.

The agitation of the screens is all the while sifting the pure from the impure particles, and allowing the latter to pass or drop through the screens into any proper receptacle below. The separation which takes place at the first part of the screen and the first blast admits of the inner and oily portions of the seed dropping upon an inclined board or chute, S, after it passes through both screens e h. The heavier portions, which neither the first blast nor screen affects, (more than this, that the blast keeps raising them up, and prevents them from clogging the meshes, while the agitation of the screens dances the particles along to their final action,) pass along the inclined screens until they receive the action of the next more powerful blast from the fan-blower T, the blast passing up the trunk U, and passing between the screens i j, through i, and the screen f above it, there being at this point triple screens by overlapping each other. Here a second separation takes place, the pure material dropping through the screens down onto the inclined board or chute V, whence it is conveyed away, and the impure or mixed portions continuing on toward the ends of the screens, where it receives a still more powerful blast from the fan-blower W, Fig. 1, the pure material dropping onto the chute X, while the lighter or impure portions are driven out at the side of the machine, the blast from W being, as it were, a cross-blast. The portions remaining on the screens pass off at the end of the frame, and may be reworked, if found to contain any valuable matter.

The bed or concave H is set on a tram-block, Y, and by means of the screw-rods p p may be raised or adjusted to the cylinder G.

The gearing for driving the separate parts of the machine has been purposely omitted in the specification, a description of it not being deemed necessary, as it is shown in the drawings, and would extend the description to a very great length.

Having thus fully described the nature of my invention, what I claim therein as new, and desire to secure by Letters Patent, is—

1. The arrangement of the hopper B, revolving toothed cylinders D E, breastplate F, crushing and grinding cylinder G, concave-bed H, with removable extended bed-plate J, and toothed cylinder L, revolving in its toothed case K, in the manner and for the purpose herein set forth.

2. The series of graduated blasts R T W and screens e f g h i j k, for the purpose of separating the oleaginous from the other impurities of the seeds, they being arranged and operating substantially in the manner and for the purpose set forth.

WILLIAM WILBER.

Witnesses:
A. B. STOUGHTON,
THOMAS H. UPPERMAN.